(12) United States Patent
Ishida et al.

(10) Patent No.: US 9,501,025 B2
(45) Date of Patent: Nov. 22, 2016

(54) GEAR TRANSMISSION DEVICE AND IMAGE FORMING APPARATUS INCLUDING THE SAME

(71) Applicants: Masahiro Ishida, Kanagawa (JP); Shinya Shimizu, Kanagawa (JP); Naoki Matsuda, Kanagawa (JP)

(72) Inventors: Masahiro Ishida, Kanagawa (JP); Shinya Shimizu, Kanagawa (JP); Naoki Matsuda, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/047,891

(22) Filed: Feb. 19, 2016

(65) Prior Publication Data

US 2016/0161898 A1  Jun. 9, 2016

Related U.S. Application Data

(60) Division of application No. 14/793,206, filed on Jul. 7, 2015, now Pat. No. 9,310,747, which is a continuation of application No. 14/449,481, filed on Aug. 1, 2014, now Pat. No. 9,163,701, which is a division of application No. 14/024,990, filed on Sep. 12, 2013, now Pat. No. 8,934,815.

(30) Foreign Application Priority Data

Nov. 2, 2012  (JP) .................................. 2012-242571

(51) Int. Cl.
*G03G 15/00* (2006.01)
*F16H 1/20* (2006.01)
(Continued)

(52) U.S. Cl.
CPC .............. *G03G 15/757* (2013.01); *F16H 1/20* (2013.01); *F16H 1/206* (2013.01); *F16H 1/28* (2013.01); *F16H 55/14* (2013.01); *F16H 55/17* (2013.01);
(Continued)

(58) Field of Classification Search
USPC ........................................................ 399/167
See application file for complete search history.

(56) References Cited

U.S. PATENT DOCUMENTS 5,761,580 A  6/1998  Harada et al.
8,934,815 B2  1/2015  Ishida et al.
(Continued)

FOREIGN PATENT DOCUMENTS

CN  1385761 A  12/2002
CN  2931928 Y  8/2007
(Continued)

OTHER PUBLICATIONS

Office Action for corresponding Chinese Application No. 201310535020.4 dated Sep. 25, 2015.

*Primary Examiner* — Rodney Fuller
(74) *Attorney, Agent, or Firm* — Harness, Dickey & Pierce

(57) ABSTRACT

A gear transmission device includes a first external gear driven by a drive motor attached to a first side of a frame and a first internal gear driven by the first external gear. The first internal gear includes an outer cylinder portion, an end plate, an annular opening, and an inner cylinder portion including a shaft hole. The outer cylinder portion includes internal teeth formed on an inner circumferential surface thereof. The inner cylinder portion is formed concentrically inside the outer cylinder portion. The end plate connects the outer cylinder portion, the inner cylinder portion, and the shaft hole at one end in an axial direction. In a state in which the annular opening faces a second side of the frame opposite the first side thereof, the first external gear is inserted to the annular opening to mesh with the internal teeth of the outer cylinder portion.

9 Claims, 14 Drawing Sheets

(51) Int. Cl.
*F16H 1/28* (2006.01)
*F16H 55/14* (2006.01)
*F16H 55/17* (2006.01)
*G03G 15/16* (2006.01)

(52) U.S. Cl.
CPC .......... *G03G 15/00* (2013.01); *G03G 15/1615* (2013.01); *F16H 2055/176* (2013.01); *Y10T 74/19684* (2015.01)

(56) References Cited

U.S. PATENT DOCUMENTS

| | | |
|---|---|---|
| 2002/0172531 A1 | 11/2002 | Harada et al. |
| 2006/0205553 A1 | 9/2006 | Lee |
| 2008/0025770 A1 | 1/2008 | Burnett |
| 2011/0293328 A1 | 12/2011 | Matsuda et al. |
| 2015/0277337 A1* | 10/2015 | Ishida .................. G03G 15/757 399/167 |
| 2015/0370214 A1* | 12/2015 | Ishida ................ G03G 21/1647 399/167 |
| 2016/0146292 A1* | 5/2016 | Matsuda .................. F16H 3/089 399/167 |

FOREIGN PATENT DOCUMENTS

| | | |
|---|---|---|
| CN | 102328375 A | 1/2012 |
| CN | 102606684 A | 7/2012 |
| JP | 61-233245 | 10/1986 |
| JP | 61-233245 A | 10/1986 |
| JP | H11311302 A | 11/1999 |
| JP | 2006171200 A | 6/2006 |
| JP | 2010101340 A | 5/2010 |

* cited by examiner

GEAR TRANSMISSION DEVICE AND IMAGE FORMING APPARATUS INCLUDING THE SAME

CROSS-REFERENCE TO RELATED APPLICATIONS

This patent application is a Continuation of U.S. application Ser. No. 14/793,206, filed Jul. 7, 2015, which is a Continuation of U.S. Pat. No. 9,163,701, issued Oct. 20, 2015, which is a Divisional of U.S. Pat. No. 8,934,815, issued Jan. 13, 2015, which claims priority pursuant to 35 U.S.C. §119 to Japanese Patent Application No. 2012-242571, filed on Nov. 2, 2012, in the Japan Patent Office, the entire disclosure of each of which is hereby incorporated by reference herein.

BACKGROUND

1. Technical Field

Exemplary aspects of the present disclosure generally relate to an image forming apparatus and a gear transmission device, and more particularly to an image forming apparatus including the gear transmission device equipped with an internal gear as a first-stage driven gear driven by a motor.

2. Description of the Related Art

Generally, known gear drive assemblies that drive a target at a low speed and a high torque include an external gear and a first-stage driven gear that meshes with the external gear. The external gear is a gear with teeth formed on the outer surface of a cylinder or a cone, and is attached to a rotary shaft of a drive motor serving as a drive source. The first-stage driven gear meshing with the external gear is configured to transmit power at a high speed and low torque. In other words, the external gear of the motor is designed to have a small number of teeth (pitch circle diameter) for acceleration. By contrast, the pitch circle diameter of the first-stage gear is relatively wide to achieve a greater deceleration ratio.

However, if the number of gear teeth of the external gear of the drive motor is reduced, an adequate contact ratio between the first-stage driven gear and the external gear cannot be secured, thereby causing fluctuation of rotation, noise, and vibration. In order to reduce noise and vibration, in one approach, grease is injected between gear teeth meshing with each other. However, the noise and vibration still remain. Furthermore, injecting grease for multiple times causes a higher risk of a foreign substance getting into the mesh portion between the gear teeth, which results in noise, degradation of rotation accuracy, and damage to the gear.

In view of the above, in order to reduce the noise and vibration, JP-H 11-311302-A proposes using an internal gear as the first-stage gear meshing with the external gear attached to the rotary shaft of the drive motor.

In this configuration, an opposite side of the meshing side of the external gear is exposed to an internal space of the internal gear so that a sound of gears meshing with each other resonates in the internal space of the internal gear and leaks outside. Furthermore, if the durability of the internal gear is not sufficient, the vibration caused by the gear mesh resonates with the internal gear, causing the vibration to spread outside.

In view of the above, there is an unsolved need for a gear transmission device that reliably prevents undesirable noise and vibration from dispersing from a driven gear.

SUMMARY

In view of the foregoing, in an aspect of this disclosure, there is provided a gear transmission device including a first frame, a drive motor, a first external gear, and a first internal gear. The drive motor includes a rotary shaft and is attached to a first side of the frame. The first external gear is connected to the rotary shaft of the drive motor and projects from a second side of the frame opposite the first side. The first internal gear is disposed near the first external gear and includes an outer cylinder portion, an inner cylinder portion, an end plate, and an annular opening. The outer cylinder portion includes internal teeth formed on an inner circumferential surface of the outer cylinder portion. The inner cylinder portion is formed concentrically inside the outer cylinder portion and includes a shaft hole formed in the center of the inner cylinder portion. The end plate connects the outer cylinder portion, the inner cylinder portion, and the shaft hole at one end in an axial direction of the shaft. The annular opening is formed between the outer cylinder portion and the inner cylinder portion at a side opposite the end plate. In a state in which the annular opening faces the second side of the frame, the first external gear is inserted to the annular opening to mesh with the internal teeth of the outer cylinder portion.

According to another aspect, an image forming apparatus includes an image bearing member, an intermediate transfer belt, a process unit, a fixing device, a sheet conveyor roller, and the gear transmission device.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1A:
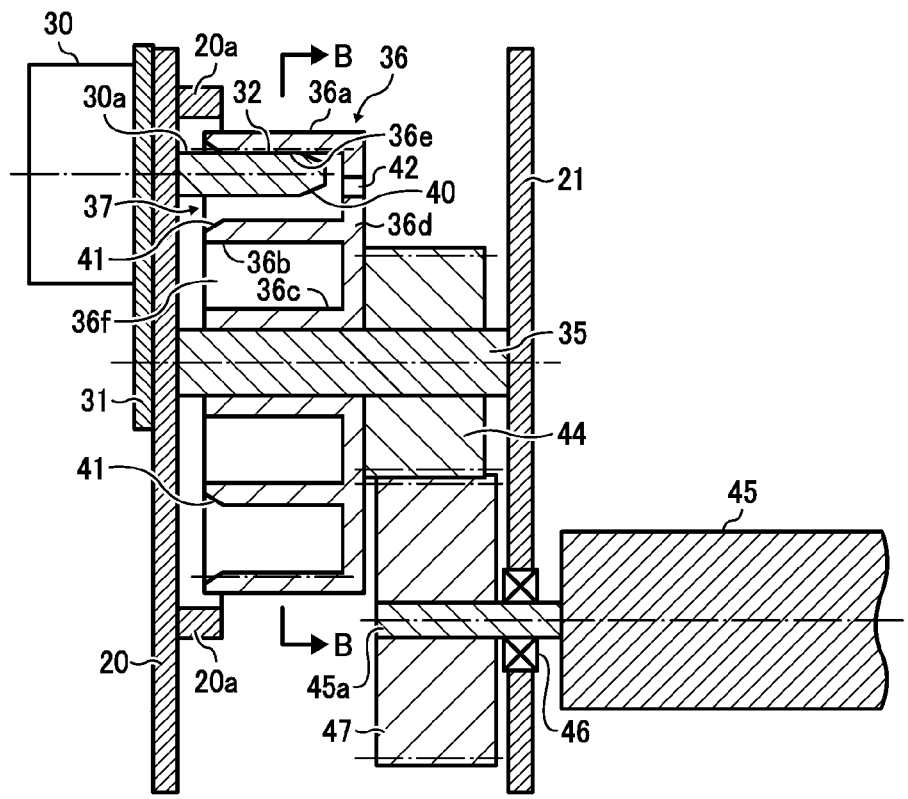
FIG. 1A is a cross-sectional view schematically illustrating a gear transmission device according to a first embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, and initially with reference to FIG. 1, a description is provided of an image forming apparatus according to an aspect of this disclosure.

Embodiment 1

Figure 1B:
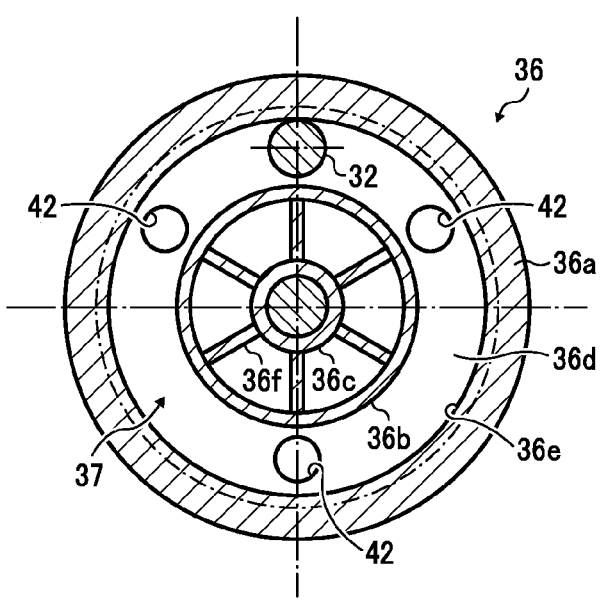
FIG. 1B is a cross-sectional view schematically illustrating the gear transmission device along a line B-B in FIG. 1A.

With reference to FIGS. 1A and 1B, a description is provided of Embodiment 1 according to an illustrative embodiment of the present disclosure. FIG. 1A is a cross-sectional view schematically illustrating a gear transmission device of Embodiment 1. FIG. 1B is a cross-sectional view schematically illustrating the gear transmission device along a line B-B in FIG. 1A. As illustrated in FIG. 1A, the gear transmission device includes a pair of first and second frames 20 and 21, a drive motor 30 serving as a drive source, a seat plate 31, and so forth. The pair of frames 20 and 21 consists of two vertical (perpendicular) plates disposed parallel with each other. The drive motor 30 is attached to one of the frames 20 and 21 via the seat plate 31. A rotary shaft 30a of the drive motor 30 penetrates through the seat plate 31 and the first frame 20 in a horizontal direction, and projects toward the second frame 21 at the opposite side. An external gear 32, a gear with the teeth formed on its outer surface, is connected to the leading end of the rotary shaft 30a as a single integrated unit. A pitch circle of the external gear 32 is relatively small in order to achieve a relatively large deceleration ratio.

The first frame 20 and the second frame 21 are connected by a support shaft 35 disposed horizontally near the drive motor 30. A driven internal gear 36, a gear with the teeth formed on its inner surface, is rotatably supported by the support shaft 35 to be proximal to the external gear 32. The driven internal gear 36 includes an outer cylinder portion 36a, an inner cylinder portion 36b, a shaft hole 36c, and an end plate 36d.

The outer cylinder portion 36a, the inner cylinder portion 36b, and the shaft hole 36c are disposed concentrically around the support shaft 35. The outer cylinder portion 36a and the inner cylinder portion 36b constitute a concentric double-wall connecting structure, thereby enhancing the durability of the internal gear 36. The end plate 36d is disposed opposite the first frame 20, and connects one end of the outer cylinder portion 36a, the inner cylinder portion 36b, and the shaft hole 36c in the axial direction, thereby sealing one side of the internal gear 36. As shown in FIG. 1A, the shaft hole 36c is long in the axial direction. However, the shaft hole 36c does not have to be long in the axial direction. Alternatively, the shaft hole 36c may have substantially the same dimension as the thickness of the end plate 36d.

The other end of the internal gear 36, which is not covered with the end plate 36d, faces the frame 20 to which the drive motor 30 is attached. An annular opening 37 between the outer cylinder portion 36a and the inner cylinder portion 36b faces the frame 20. Internal teeth 36e are formed on the inner circumferential surface of the outer cylinder portion 36a. The external gear 32 of the drive motor 30 inserted into the annular opening 37 meshes with the internal teeth 36e. As illustrated in FIG. 1B, the inner cylinder portion 36b and the shaft hole 36c are connected by ribs 36f in a radial direction. In the illustrative embodiment, six ribs 36f are provided. However, the number of the ribs is not limited to six.

The leading end portion of the external gear 32 is tapered or narrows toward the leading end (hereinafter referred to as a male taper portion 40). A female taper portion 41 is formed on the rim of the opening of the outer cylinder portion 36b. The male taper portion 40 and the female taper portion 41 allow the external gear 32 to be inserted into the annular opening 37 and mesh with the internal gear 36e smoothly.

As illustrated in FIGS. 1A and 1B, an access hole 42 is formed at each of three positions around the circumference of the end plate 36d at certain intervals. The external gear 32 is accessed through the three access holes 42 when supplying grease to the external gear 32 and checking the gear meshing performance.

As illustrated in FIG. 1A, the first frame 20 at the drive motor side includes an annular rib 20a having a predetermined height. The annular rib 20a is formed to surround a portion of or an entire circumference of the exterior of the outer cylinder portion 36a at the opening side. The annular rib 20a overlaps with an outer circumference of the driven internal gear 36 in the radial direction by a certain amount in the axial direction. Accordingly, the annular opening 37 of the internal gear 36 is prevented from getting directly exposed to the outside.

An external gear 44 (i.e., a second external gear) is formed integrally on the outer surface of the end plate 36d of the driven internal gear 36. The outer diameter of the external gear 44 is approximately half the external diameter of the driven internal gear 36. The support shaft 35 of the driven internal gear 36 penetrates through the shaft center of the external gear 44. The driven internal gear 36 and the external gear 44 jointly rotate about the support shaft 35.

A driven shaft 45 as a drive target is horizontal and rotatably attached to the second frame 21 opposite the first frame 20. An input shaft 45a of the driven shaft 45 is supported by the second frame 21 via a shaft bearing 46. The input shaft 45a of the driven shaft 45 protrudes between the first frame 20 and the second frame 21. An external gear 47 is connected to the input shaft 45a.

The external gear 47 meshes with the external gear 44 integrated with the driven internal gear 36. Accordingly, the drive force of the drive motor 30 is transmitted sequentially from the external gear 32, the driven internal gear 36, the external gear 44, the external gear 47, and the driven shaft 45.

When the drive force is transmitted from the external gear 32 to the internal teeth 36e of the driven internal gear 36, noise and vibration due to meshing gears are confined in the annular opening 37. The stiffness of the driven internal gear 36 is enhanced by the concentric double-wall connecting structure constituted of the outer cylinder portion 36a, the inner cylinder portion 36b, and the end plate 36d. With this configuration, noise and vibration are reliably and effectively prevented from getting dispersed outside the driven internal gear 36. It is to be noted that a transmission path of a subsequent stage (second stage) downstream from the driven internal gear 36 includes, in addition to the external gear 47, a second-stage internal gear or a second-stage pulley individually, or arbitrarily combined.

Embodiment 2

Figure 2:
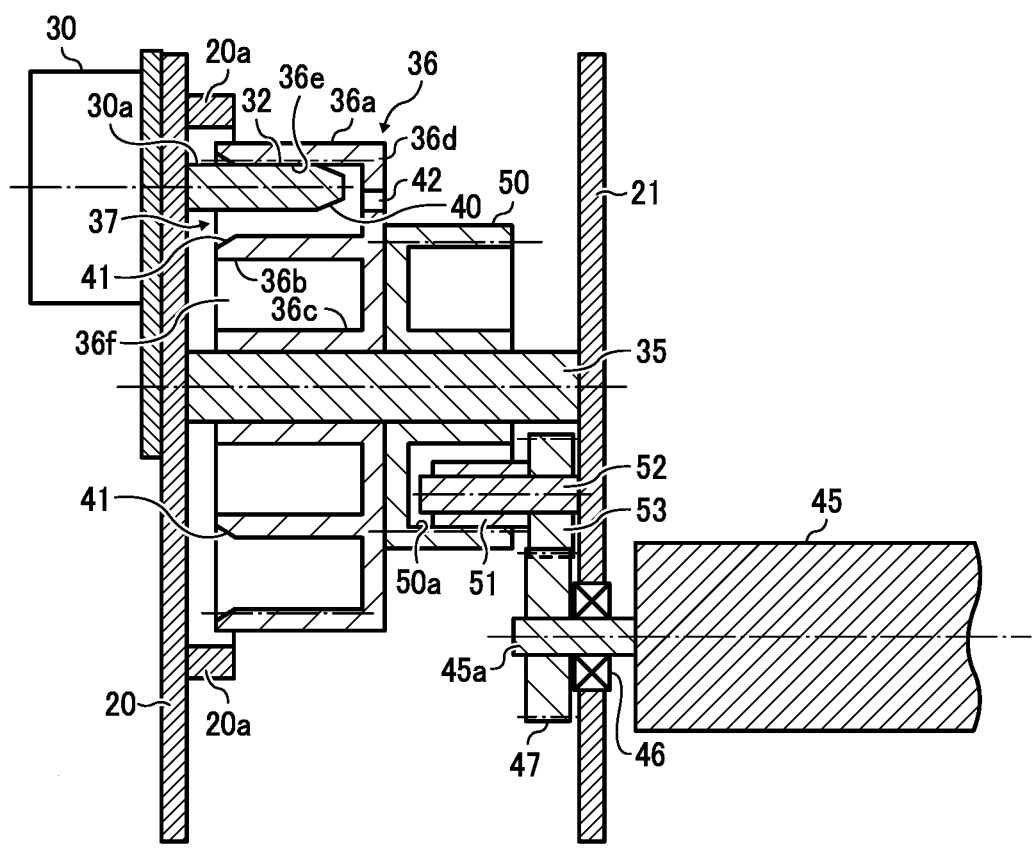
FIG. 2 is a cross-sectional view schematically illustrating the gear transmission device according to a second embodiment of the present disclosure.

With reference to FIG. 2, a description is provided of another illustrative embodiment of the present disclosure. In the present illustrative embodiment, the external gear 44 integrally provided with the drive internal gear 36 in Embodiment 1 is changed to a second internal gear 50. Both ends of the support shaft 35 common to the driven internal gear 36 and the second internal gear 50 are supported by a pair of the first and the second frames 20 and 21. An external gear 51 with a relatively small diameter meshes with internal teeth 50a of the second internal gear 50. The external gear 51 is rotatably supported by a support shaft 52 integrally formed with the second frame 21.

The external gear 51 is integrated with an external gear 53 having a relatively large diameter. The external gear 53 is disposed outside the second internal gear 50. The external gears 51 and 53 constitute the second stage of the gear assembly. The external gear 53 of the second stage meshes with the external gear 47 attached to the input shaft 45a of the driven shaft 45. Except for the configuration described above, the configurations in the present illustrative embodiment are similar to or the same as in Embodiment 1 shown in FIGS. 1A and 1B. Thus, the description thereof is omitted.

Embodiment 3

Figure 3:
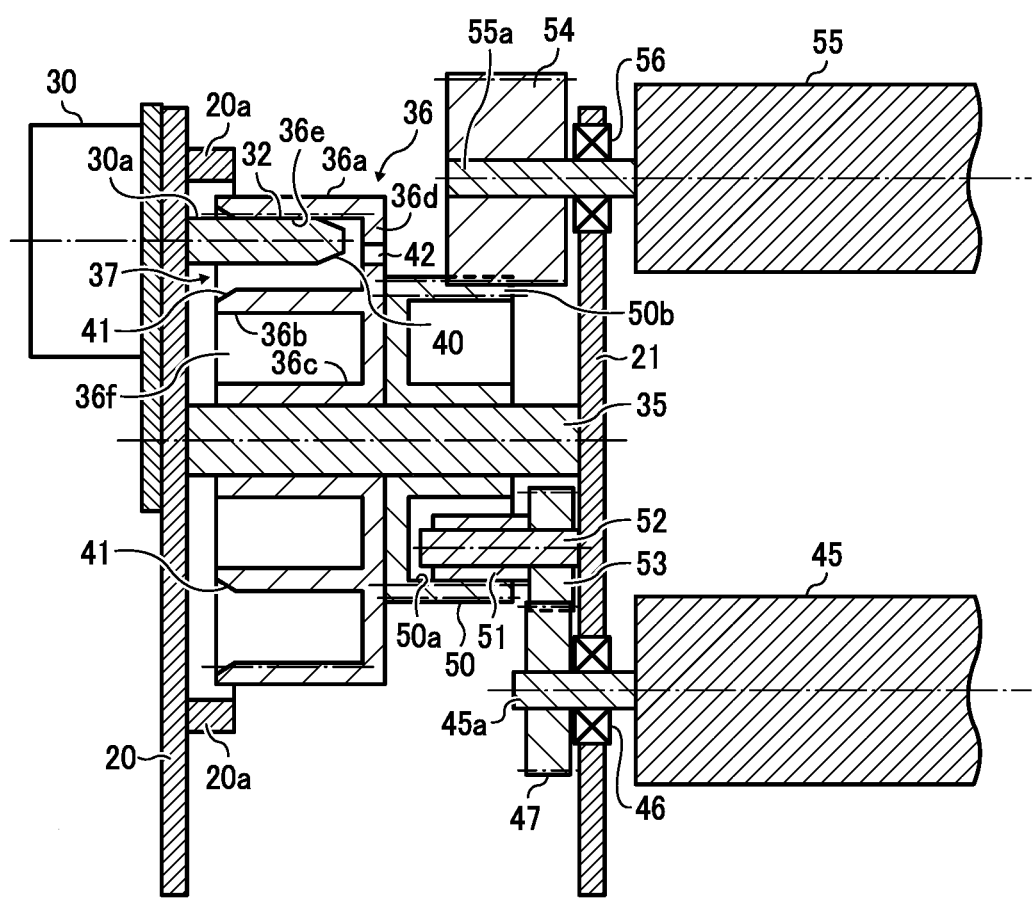
FIG. 3 is a cross-sectional view schematically illustrating the gear transmission device according to a third embodiment of the present disclosure.

With reference to FIG. 3, a description is provided of another illustrative embodiment of the present disclosure. In the present illustrative embodiment, the drive motor 30 drives simultaneously both a top and a bottom shafts, i.e., a driven shaft 55 and the driven shaft 45. In other words, external teeth (second external gear) 50b are formed on the outer circumferential surface of the second internal gear 50. The external teeth 50b mesh with an external gear 54 attached to an input shaft 55a of the driven shaft 55.

The input shaft 55a is rotatably supported by the second frame 21 through a shaft bearing 56. Except for the configuration described above, the configurations in the present illustrative embodiment are similar to or the same as that shown in FIG. 2. According to the present illustrative embodiment, the drive torque of the drive motor 30 is distributed in accordance with a deceleration ratio of gears to the driven shafts 45 and 55.

Embodiment 4

Figure 4:
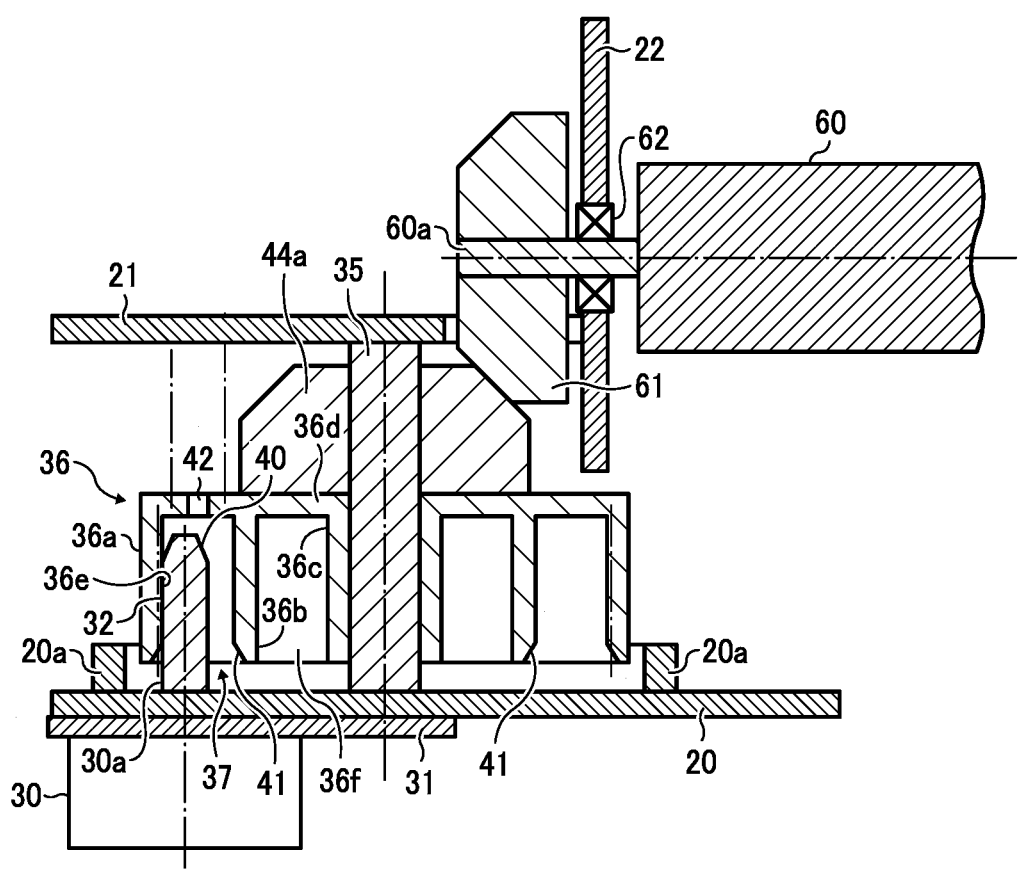
FIG. 4 is a cross-sectional view schematically illustrating the gear transmission device according to a fourth embodiment of the present disclosure.

With reference to FIG. 4, a description is provided of another illustrative embodiment of the present disclosure. In the present illustrative embodiment, a driven shaft 60 is disposed perpendicular to the rotary shaft 30a of the drive motor 30. In other words, the frame 20 to which the drive motor 30 is attached is disposed horizontally, and the rotary shaft 30a of the drive motor 30 and the external gear 32 are disposed facing upward in the vertical direction.

It is to be noted that in Embodiment 1, the driven internal gear 36 and the external gear 44 are disposed vertically. In the present illustrative embodiment, by comparison, the driven internal gear 36 and the external gear 44 are disposed horizontally. Other than that, the driven internal gear 36 and the external gear 44 have the same configurations as that in Embodiment 1.

In Embodiment 4, the external gear 44 is changed to a bevel gear (second external gear) 44a. Another bevel gear 61 meshes vertically with the bevel gear 44a. The bevel gear 61 of the second stage is attached to an input shaft 60a of the horizontally-disposed driven shaft 60. The input shaft 60a is rotatably supported by a shaft bearing 62 disposed on a third planar frame 22 disposed vertically.

The bevel gear 44a and the bevel gear 61 may be helical gears and mesh with each other. By meshing the helical gears, the driven internal gear 36 is biased in the axial direction due to a force in the axial direction of the meshing drive torque acting on the helical gears.

As described above, when there is a gap between the driven internal gear 36 and the frame 20, noise and vibration easily disperse outside from the gap. Generally, the driven internal gear 36 is configured to include some clearance in the axial direction, thereby facilitating assembly of the gears. By biasing the driven internal gear 36 against the frame 20 by the force of the helical gears, the gap between the frame 20 and the driven internal gear 36 can be reduced as much as possible. The angular direction of the helical gear is set such that the driven internal gear 36 is biased towards the frame 20.

Both ends of the support shaft 35, which is a common shaft for the driven internal gear 36 and the bevel gear 44a, are supported by the pair of the top and the bottom frames 20 and 21. Because the external gear 32 is disposed vertically facing upward, the annular opening 37 of the driven internal gear 36 faces down, thereby preventing foreign substance such as dust from entering inside the driven internal gear 36. Furthermore, this configuration facilitates downward application of the grease to the external gear 32 from the access hole 42 of the end plate 36d of the driven internal gear 36.

Embodiment 5

Figure 5:
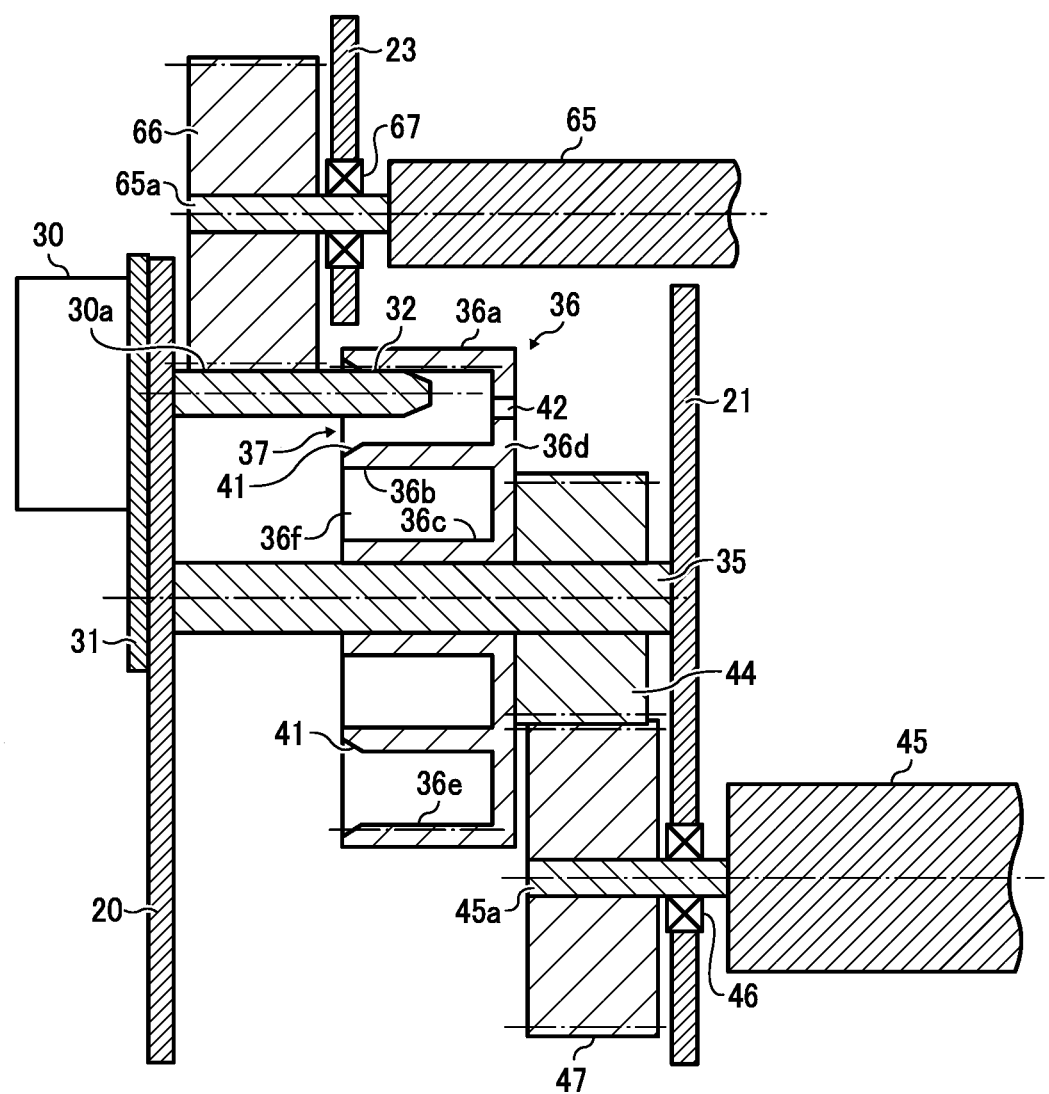
FIG. 5 is a cross-sectional view schematically illustrating the gear transmission device according to a fifth embodiment of the present disclosure.

With reference to FIG. 5, a description is provided of another illustrative embodiment of the present disclosure. According to the present illustrative embodiment, two driven shafts 45 and 65 are driven simultaneously by the drive motor 30. An external gear 66 (third external gear) attached to an input shaft 65a of a second driven shaft 65 meshes with the external gear 32. The input shaft 65a is rotatably supported by a fourth planar frame 23 via a shaft bearing 67. The fourth planar frame 23 is perpendicular to the input shaft 65a. Except for the configuration described above, the configurations of Embodiment 5 are basically the same as Embodiment 1 shown in FIGS. 1A and 1B.

According to the present illustrative embodiment, when constituting the driven internal gear 36 with a resin gear, in particular, the load applied to the resin gear is effectively reduced. In other words, when transmitting the entire drive torque of the external gear 32 through the driven internal gear 36, the load is applied to the driven internal gear 36 excessively. In view of the above, a part of the drive torque is distributed to the driven shaft 65 by the external gear 66. It is to be noted that due to the degree of the contact ratio of the gears the drive torque distributed to the driven internal gear 36 can be set greater than the drive torque distributed to the external gear 66.

Embodiment 6

Figure 6:
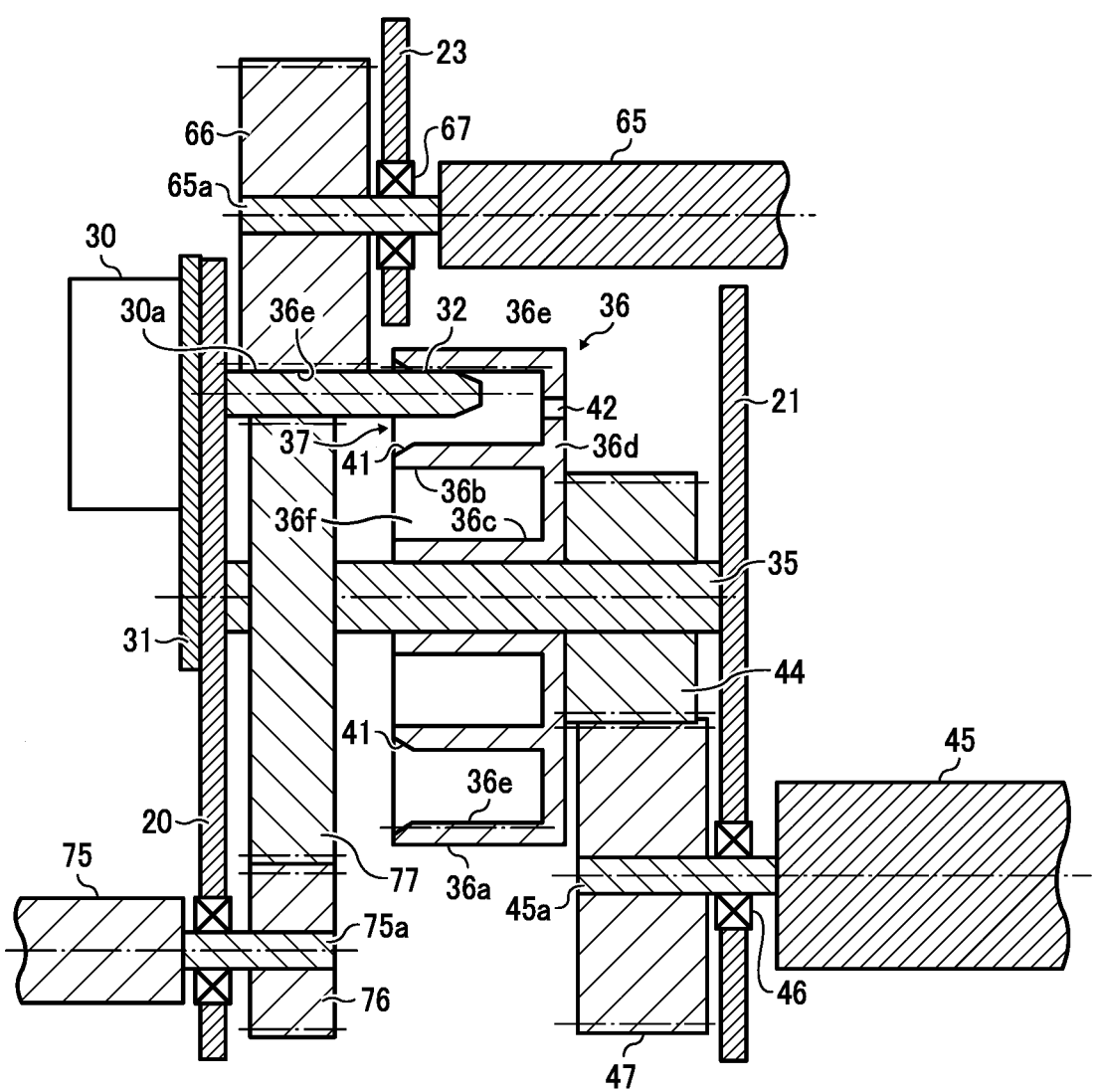
FIG. 6 is a cross-sectional view schematically illustrating the gear transmission device according to a sixth embodiment of the present disclosure.

With reference to FIG. 6, a description is provided of another illustrative embodiment of the present disclosure. According to the present illustrative embodiment, three driven shafts 45, 65, and 75 are simultaneously driven by the drive motor 30. Torque is distributed to the three driven shafts 45, 65, and 75 in accordance with the deceleration ratio before the three driven shafts 45, 55, and 75. The gear train before the first driven shaft 45 and the second driven shaft 65 is the same as that of Embodiment 5.

An external gear 76 attached to an input shaft 75a of a third driven shaft 75 is driven by the external gear 32 via an external gear 77 (third external gear) attached rotatably to the support shaft 35. In other words, the external gear 77 in the middle meshes with both the external gear 32 and the external gear 76, thereby transmitting driving torque. It is to be noted that due to the degree of the contact ratio of the gears the drive torque distributed to the driven internal gear 36 can be set greater than the drive torque distributed to the external gear 66 or the external gear 77.

Embodiment 7

Figure 7:
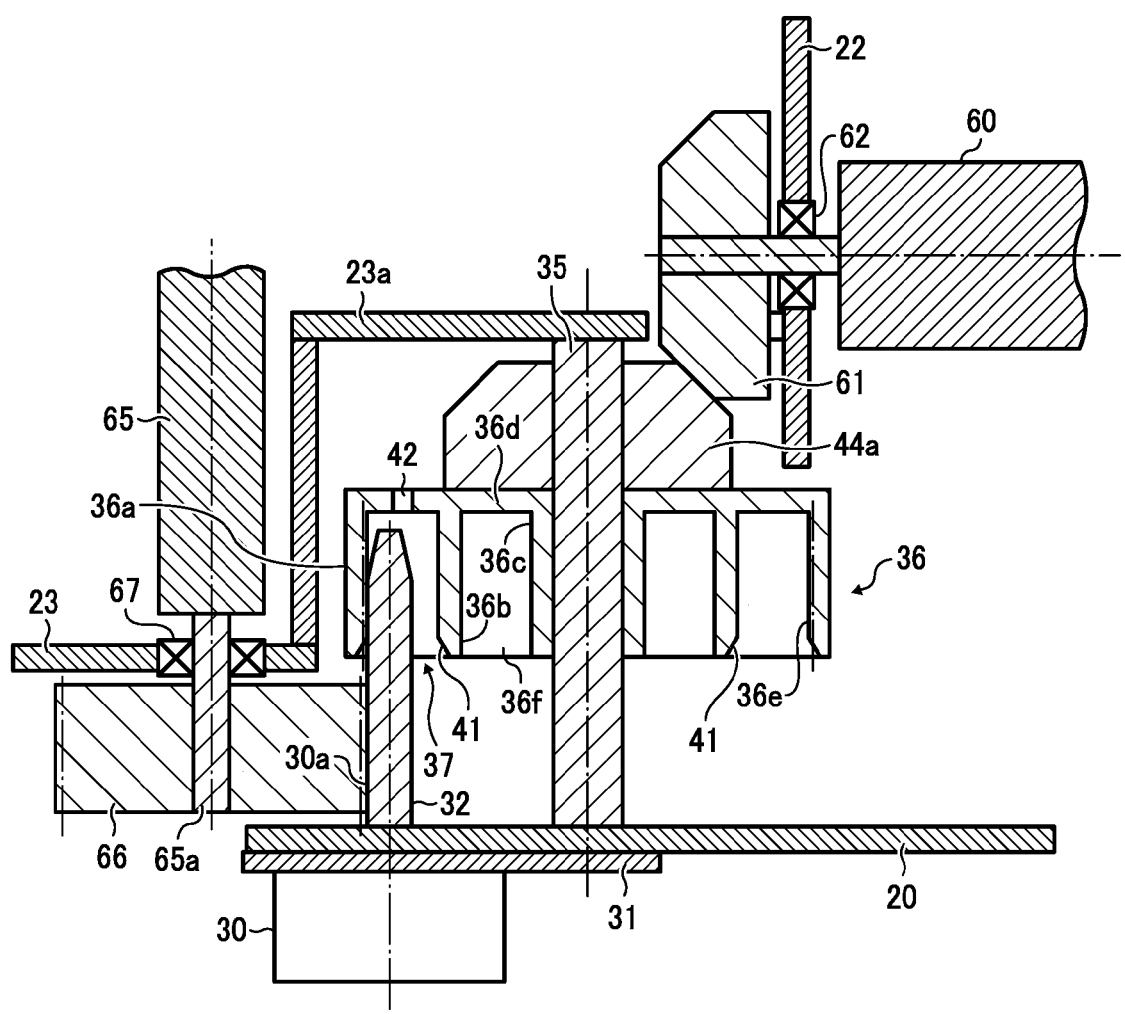
FIG. 7 is a cross-sectional view schematically illustrating the gear transmission device according to a seventh embodiment of the present disclosure.

With reference to FIG. 7, a description is provided of another illustrative embodiment of the present disclosure. According to the present illustrative embodiment, the rotary shaft 30a of the drive motor 30 is disposed vertically upward. Two driven shafts 60 and 65, one being horizontally disposed and another being vertically disposed, are driven simultaneously by the drive motor 30. Similar to the configuration shown in FIG. 4, the annular opening 37 of the driven internal gear 36 faces downward, thereby preventing foreign substance such as dust from entering inside the driven internal gear 36.

The external gear 66 (third external gear) attached to the input shaft 65a of the second driven shaft 65 meshes with the external gear 32 of the drive motor 30 between the driven internal gear 36 and the frame 20. The input shaft 65a is rotatably supported through the shaft bearing 67 by the frame 23 horizontally disposed. The upper end of the support shaft 35 is supported by an extension 23a extended from the frame 23. Except for the configuration described above, the configurations in the present illustrative embodiments are similar to or the same as that shown in FIG. 4.

According to the present illustrative embodiment, the external gear 32, the internal teeth 36e, and the bevel gears 44a and 61 may have helical teeth. With this configuration, the driven internal gear 36 can be biased against the frame 20 at the bottom by the force in the axial direction of the drive torque.

Embodiment 8

Figure 8:
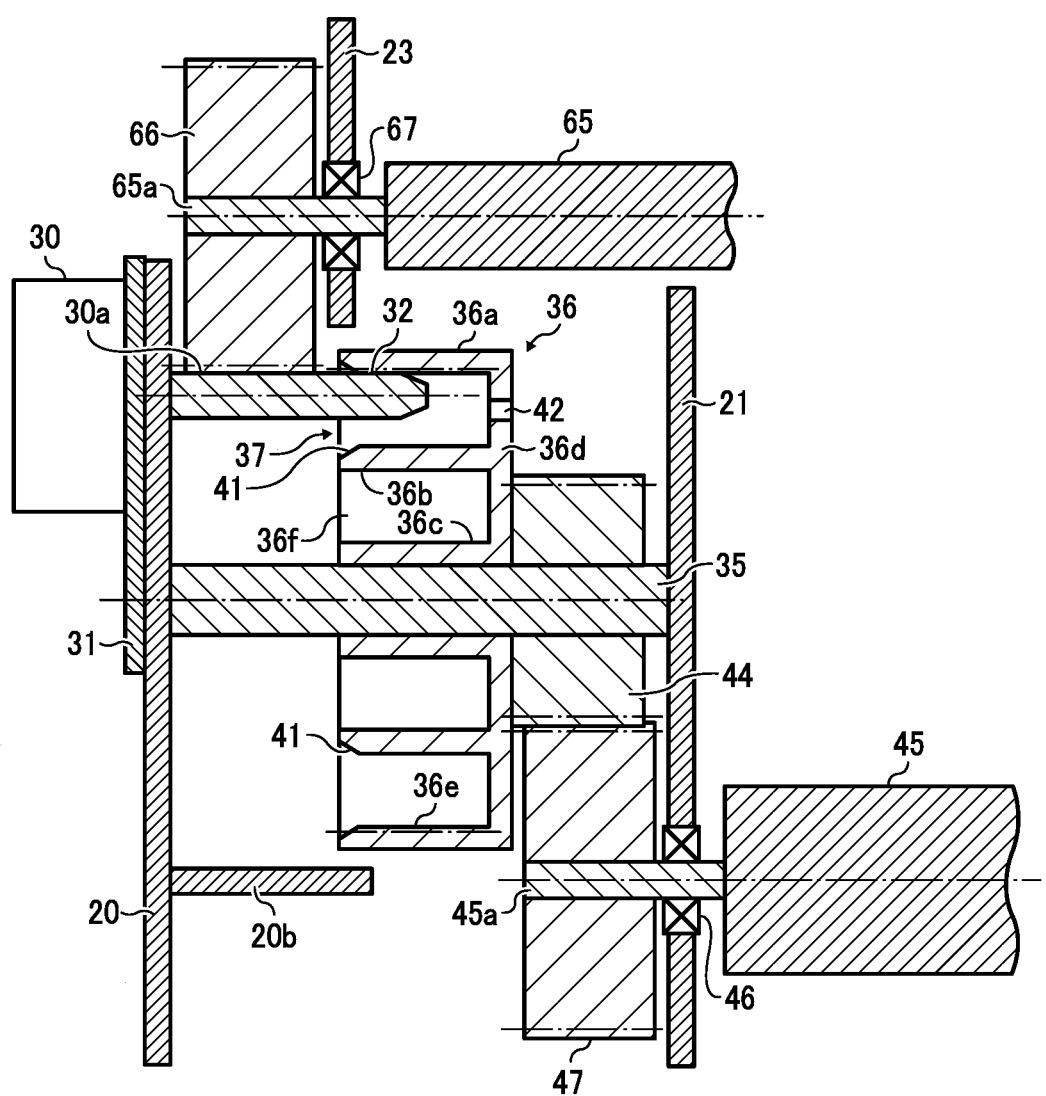
FIG. 8 is a cross-sectional view schematically illustrating the gear transmission device according to a eighth embodiment of the present disclosure.

With reference to FIG. 8, a description is provided of another illustrative embodiment of the present disclosure. In the present illustrative embodiment, the drive motor 30 drives simultaneously two driven shafts 45 and 65 which are disposed parallel to each other and spaced apart in the vertical direction. The external gear 66 (third external gear) attached to the input shaft 65a of the upper driven shaft 65 meshes with the external gear 32 of the drive motor 30.

The input shaft 65a is supported through the shaft bearing 67 by the frame 23 vertically disposed. The outer circumference of the outer cylinder portion 36a of the driven internal gear 36 at the opening side is covered with a rib 20b extending from the frame 20 in the horizontal direction. With this configuration, noise and vibration caused by meshing the external gear 32 and the internal teeth 36e are prevented from getting dissipated outside. Except for the configuration described above, the configurations of the present illustrative embodiment are similar to or the same as Embodiment 1 shown in FIGS. 1A and 1B.

Embodiment 9

Figure 9:
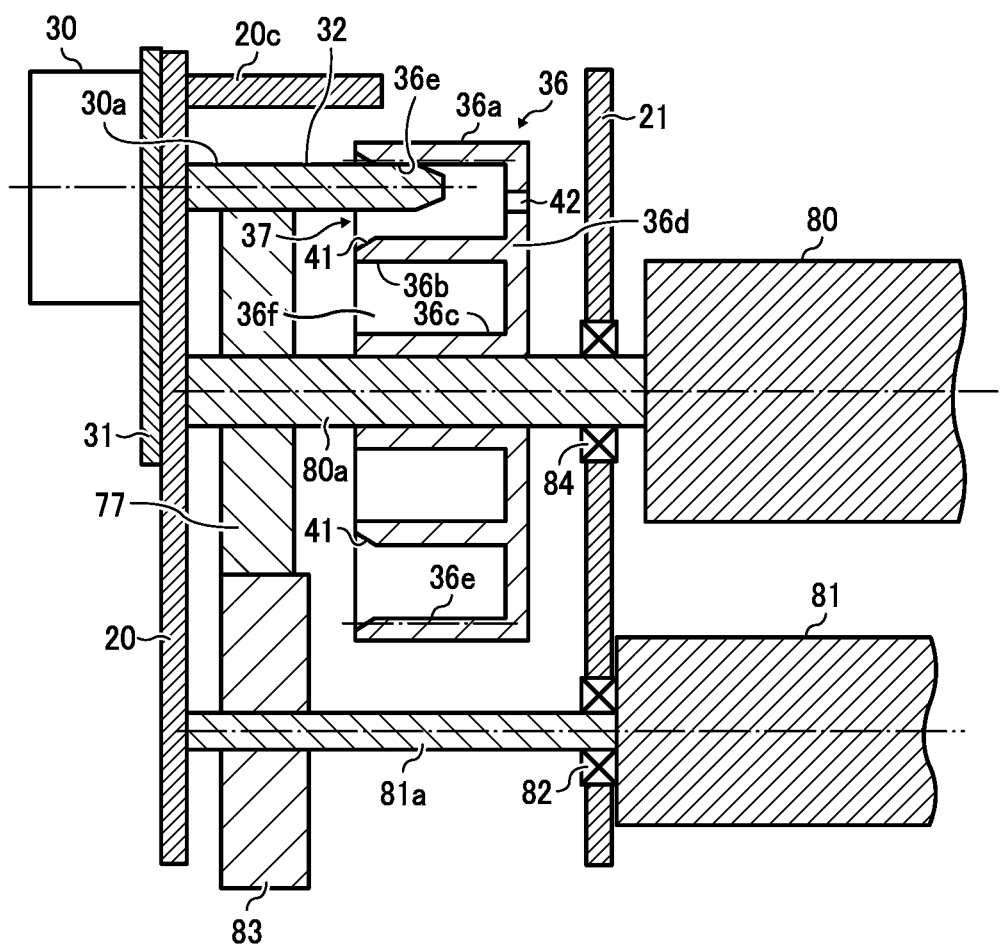
FIG. 9 is a cross-sectional view schematically illustrating the gear transmission device according to a ninth embodiment of the present disclosure.

With reference to FIG. 9, a description is provided of another illustrative embodiment of the present disclosure. In the present illustrative embodiment, the drive motor 30 drives simultaneously two driven shafts 80 and 81 which are closely disposed parallel to each other in the vertical direction. An input shaft 80a of the driven shaft 80 serves also as a support shaft for the driven internal gear 36 and for the external gear 77. The input shaft 80a is rotatably supported by the frame 21 through a shaft bearing 84.

An input shaft 81a of the driven shaft 81 at the bottom is rotatably supported by the second frame 21 through a shaft bearing 82. The other end or the leading end of the input shaft 81a extends towards the first frame 20 at the opposite side and is rotatably supported by the first frame 20. An external gear 83, which is a tenth gear at the driven side, is attached to the input shaft 81a near the leading end thereof rotatably supported by the first frame 20. The external gear 83 meshes with the external gear 77 (third external gear) in the middle. The external gear 77 in the middle meshes with both the external gear 32 and the external gear 83 (tenth gear) of the driven side.

As illustrated in FIG. 9, the external gear 32 of the drive motor 30 is covered with a rib 20c projecting horizontally from the upper portion of the frame 20. With this configuration, noise and vibration due to meshing gears, i.e., the external gear 32 and the internal teeth 36e, are confined inside the driven internal gear 36.

Embodiment 10

Figure 10:
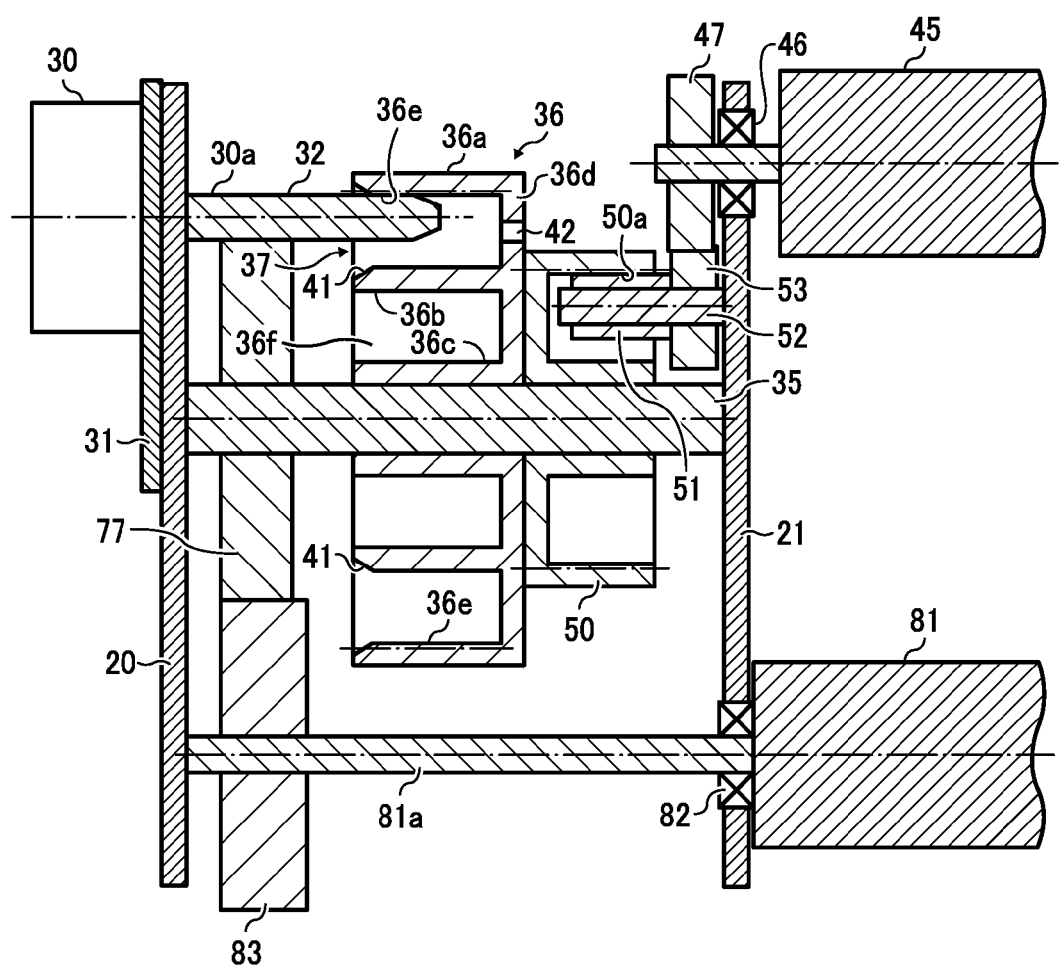
FIG. 10 is a cross-sectional view schematically illustrating a gear transmission device according to a tenth embodiment of the present disclosure.

With reference to FIG. 10, a description is provided of another illustrative embodiment of the present disclosure. In the present illustrative embodiment, the drive motor 30 drives simultaneously two driven shafts 45 and 81 which are disposed parallel to each other and spaced apart in the vertical direction. The driving method for the lower driven shaft, i.e., the driven shaft 81, is the same as that of FIG. 9.

The driving method for the upper driven shaft, i.e., the driven shaft 45, is the same as that of Embodiment 2 and Embodiment 3 shown in FIGS. 2 and 3. More specifically, the driven shaft 45 is driven by the output of the external teeth 50a of the second internal gear 50 having a slightly smaller diameter than that of the driven internal gear 36. The driven internal gear 36 and the second internal gear 50 are disposed back-to-back as an integrated unit.

The support shaft 52 is attached to the second frame 21. The two-stage external gear including the external gear 51 with a large diameter and the external gear 53 with a small diameter is attached rotatably to the support shaft 52. The external gear 51 with a small diameter meshes with the internal teeth 50a. The external gear 53 with a large diameter meshes with the external gear 47 attached to the input shaft 45a of the second driven shaft 45. With this configuration, the rotation of the second internal gear 50 is decelerated, and the decelerated rotation is transmitted to the driven shaft 45.

Embodiment 11

Figure 11:
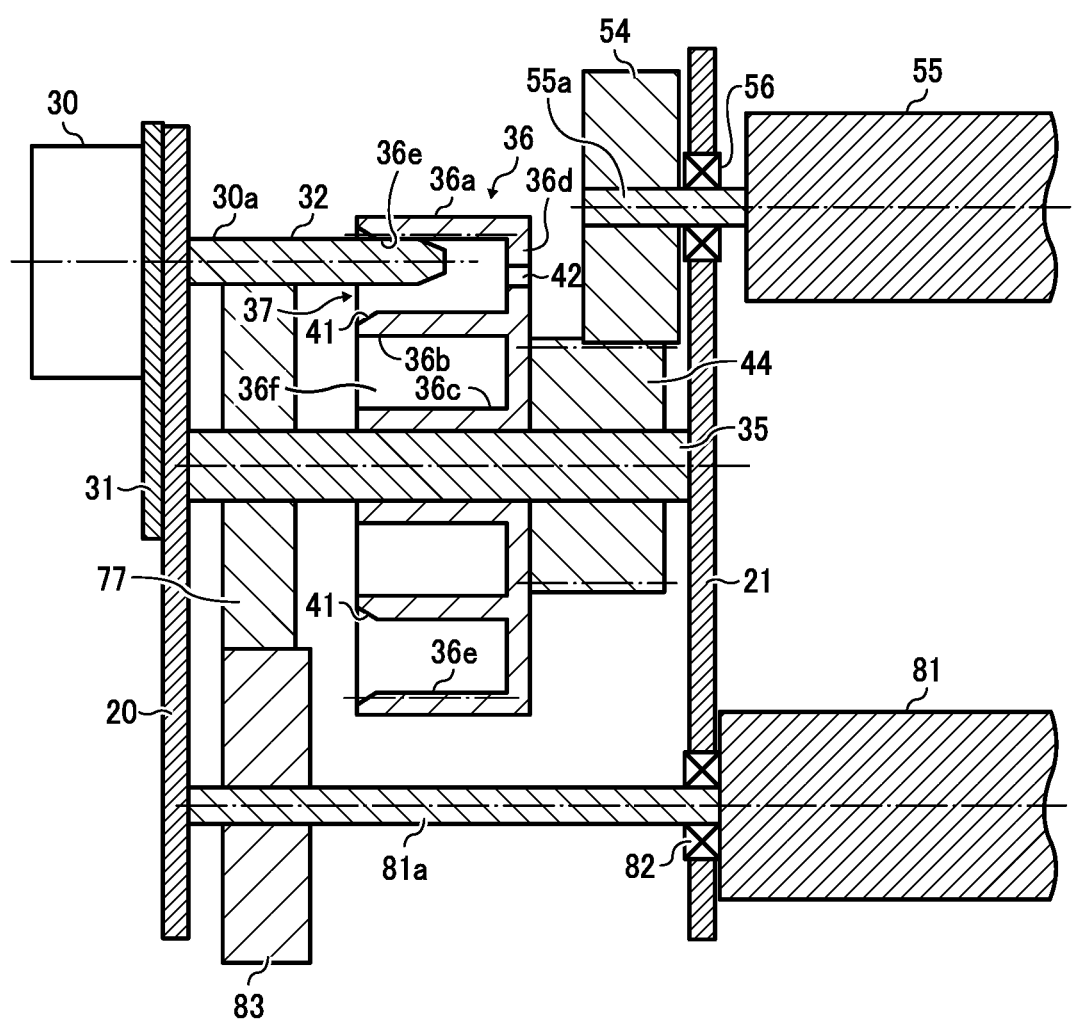
FIG. 11 is a cross-sectional view schematically illustrating the gear transmission device according to an eleventh embodiment of the present disclosure.

With reference to FIG. 11, a description is provided of another illustrative embodiment of the present disclosure. In the present illustrative embodiment, the drive motor 30 drives simultaneously two driven shafts 55 and 81 which are disposed parallel to each other and spaced apart in the vertical direction. The driving method for the lower driven shaft, i.e., the driven shaft 81, is the same as that of Embodiment 9 and Embodiment 10 shown in FIGS. 9 and 10, respectively.

The upper driven shaft, i.e., the driven shaft 55, is driven by the external gear 54. More specifically, the driven internal gear 36 and the external gear (second external gear) 44 are disposed back-to-back as an integrated unit. The external gear 54 attached to the input shaft 55a of the second driven shaft 55 meshes with the external gear 44. The input shaft 55a is rotatably supported by the second frame 21 through the shaft bearing 56.

Embodiment 12

Figure 12:
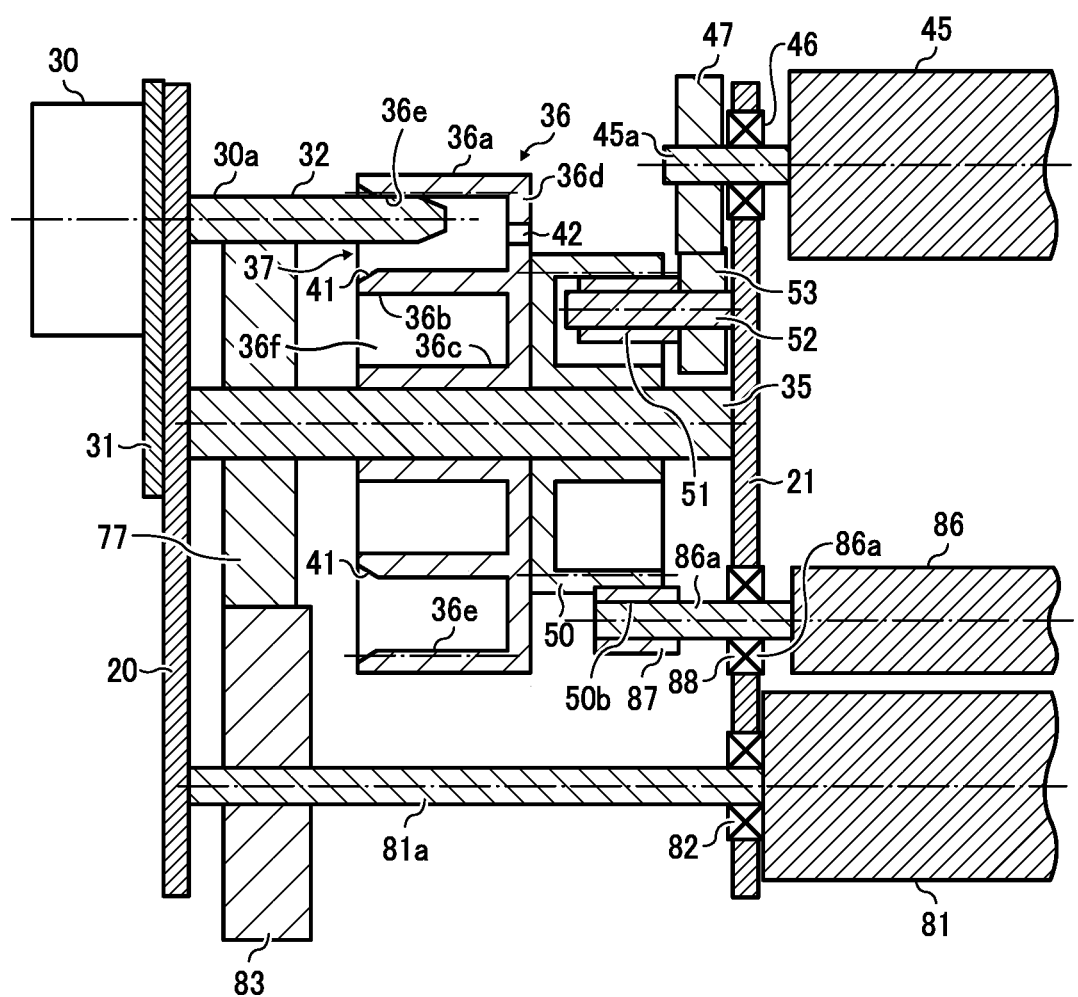
FIG. 12 is a cross-sectional view schematically illustrating the gear transmission device according to a twelfth embodiment of the present disclosure.

With reference to FIG. 12, a description is provided of another illustrative embodiment of the present disclosure. In the present illustrative embodiment, the drive motor 30 drives simultaneously three driven shafts 45, 81, and 86 which are disposed horizontally and parallel to each other. The driving method for the top and the bottom driven shafts, i.e., the driven shafts 45 and 81, respectively, is the same as that of Embodiment 10 shown in FIG. 10.

An external gear 87 with a relatively small diameter attached to an input shaft 86a of a third driven shaft 86 in the middle meshes with the external teeth 50b formed on the outer circumferential surface of the second internal gear 50, thereby driving the third driven shaft 86. The third driven shaft 86 and the second internal gear 50 are formed back-to-back as an integrated unit. The input shaft 86a is rotatably supported by the second frame 21 through a shaft bearing 88.

Embodiment 13

Figure 13:
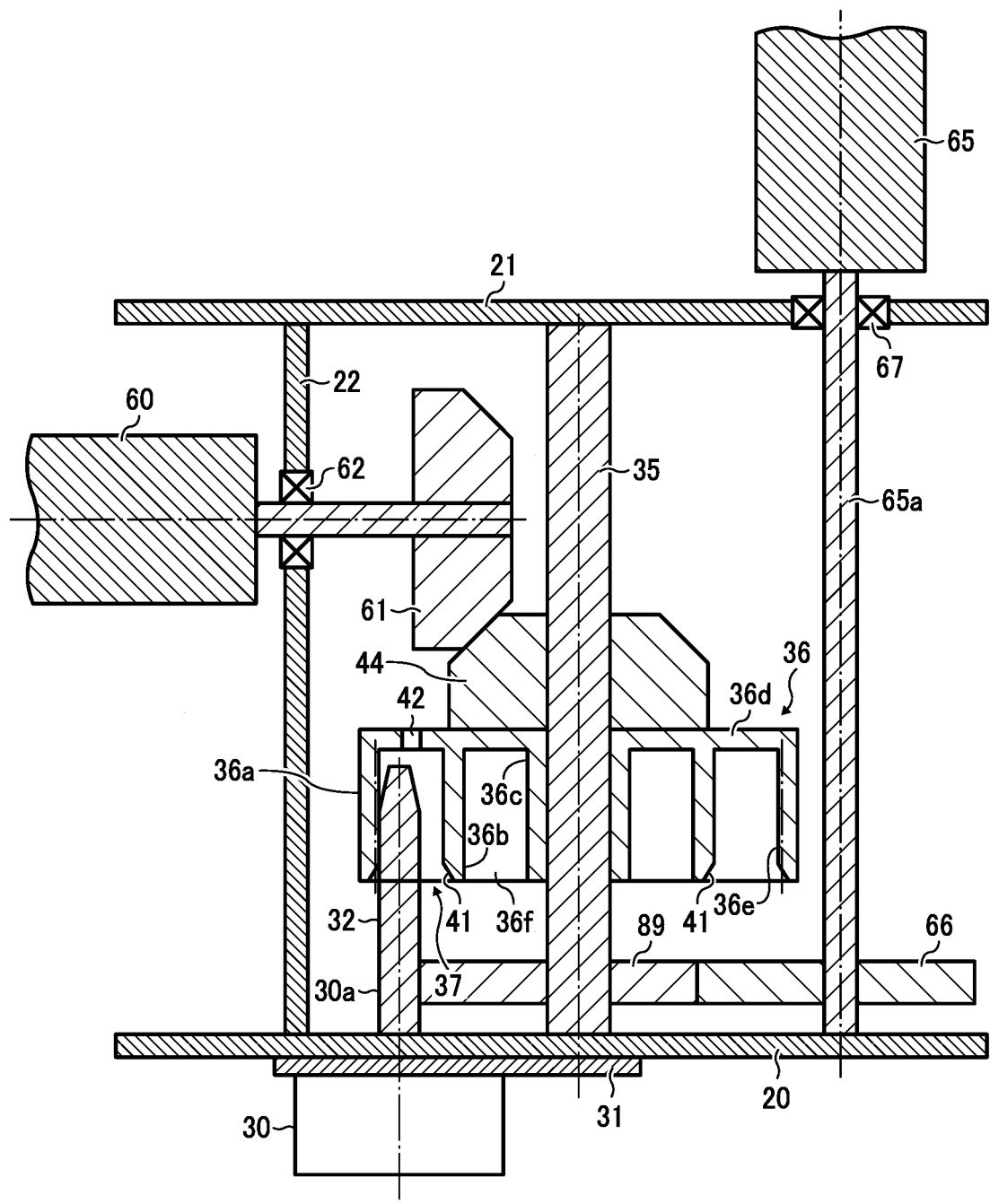
FIG. 13 is a cross-sectional view schematically illustrating the gear transmission device according to a thirteenth embodiment of the present disclosure.

With reference to FIG. 13, a description is provided of another illustrative embodiment of the present disclosure. According to the present illustrative embodiment, two driven shafts 60 and 65, one being vertically disposed and another being horizontally disposed, are driven simultaneously by the drive motor 30. In FIG. 13, the external gear 32 is disposed vertically upward. Two frames 20 and 21 are disposed horizontally. FIG. 13 shows the gear assembly of FIG. 7 with left and right reversed. In order to drive the perpendicular second driven shaft 65, rather than obtaining a drive torque directly from the external gear 32 of the drive motor 30, an external gear (third external gear) 89 is disposed substantially in the middle.

The external gear 89 is rotatably supported by the support shaft 35 of the driven internal gear 36, while meshing with the external gear 32 of the drive motor 30 at one side and meshing with the external gear 66 attached to the input shaft 65a of the driven shaft 65 on the other side. Except for the configuration described above, the configuration of Embodiment 13 is basically the same as that of Embodiment 7 shown in FIG. 7.

It is to be noted that due to the degree of the contact ratio of the gears the drive torque distributed to the driven internal gear 36 can be set greater than the drive torque distributed to the external gear 86.

The gear transmission device according to the illustrative embodiments is applied to various devices to drive a target. For example, the gear transmission device is applicable to an image forming apparatus.

Figure 14:
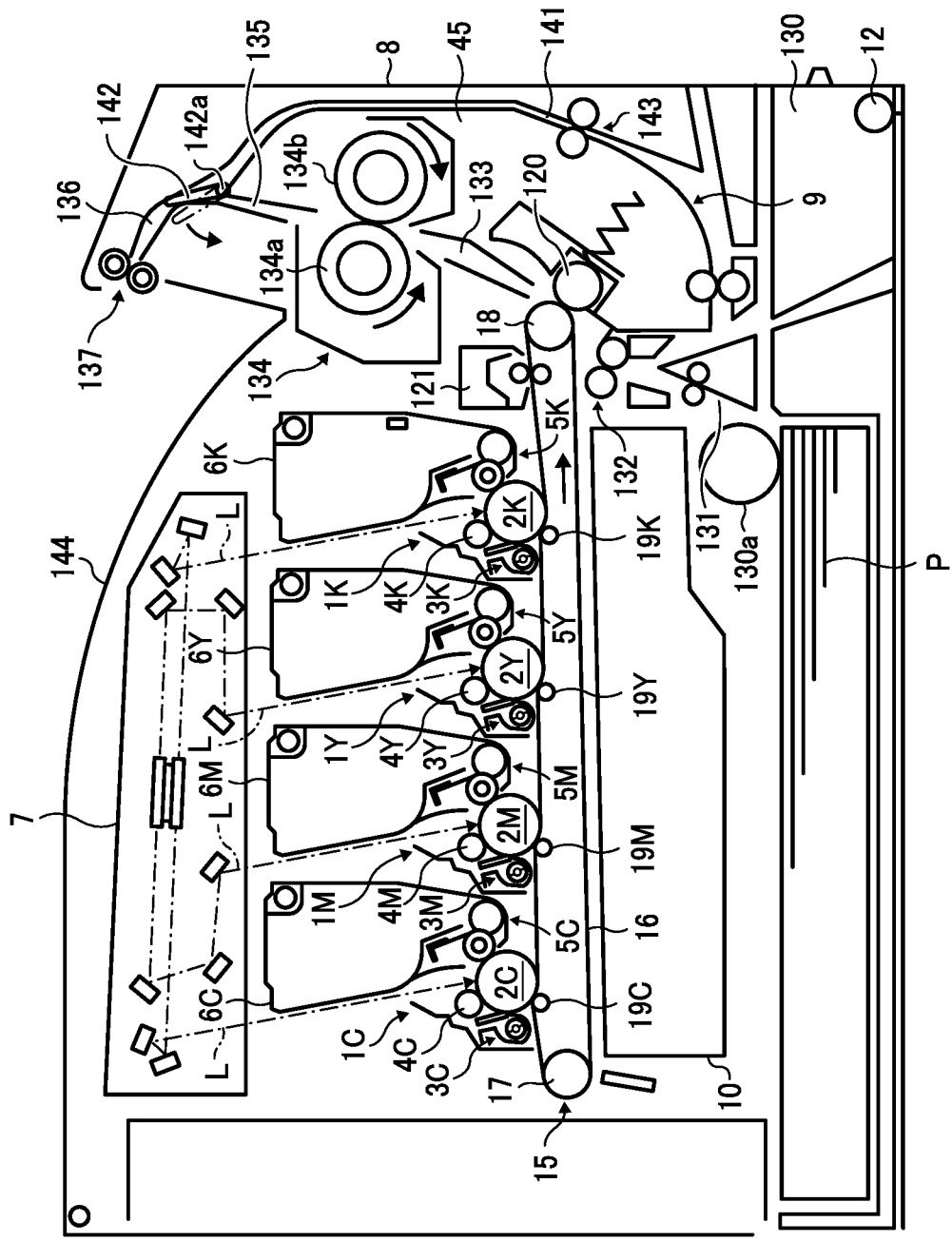
FIG. 14 is a cross-sectional view schematically illustrating an image forming apparatus employing the gear transmission device according to an illustrative embodiment of the present invention.

With reference to FIG. 14, a description is provided of an image forming apparatus employing the gear transmission device according to the illustrative embodiments of the present disclosure. FIG. 14 is a perspective view schematically illustrating a laser printer as an example of the image forming apparatus. In the image forming apparatus, the gear transmission device of the illustrative embodiments described above drives at least one of process units 1K, 1Y 1M, and 1C, image bearing members 2K, 2Y, 2M, and 2C, an intermediate transfer belt 16, a sheet feed roller 130a, and a fixing device 134.

As illustrated in FIG. 14, the image forming apparatus includes a sheet tray 130 at the bottom thereof. A lateral cover 8, which can be opened upon inspection of the inside of the image forming apparatus, is disposed above the sheet tray 130 and constitutes an exterior surface of the image forming apparatus. A sheet output tray 144 is disposed at the upper portion of the image forming apparatus. Inside the lateral cover 8, a duplexing unit 9 is disposed. A rotary shaft 12 is disposed at the bottom of the image forming apparatus, and the lateral cover 8 is rotatable about the rotary shaft 12 towards the front.

The duplexing 9 unit includes a conveyor housing. At the back of the conveyor housing, a sheet return path is formed. The inner side of the conveyor housing constitutes a portion of the sheet delivery path in the main body of the image forming apparatus. A secondary transfer roller 120 serving as a transfer device and one of the timing rollers 132, that is, a drive roller, are disposed at the inner side of the conveyor housing. As will be described later, the secondary transfer roller 120 and a drive roller 18 at the main body side constitute a roller pair that delivers the recording medium P. The secondary transfer roller and a drive roller at the main body side constitute the timing roller pair 132.

As illustrated in FIG. 14, the image forming apparatus includes a main body housing in which four process units 1K, 1Y, 1M, and 1C, one for each of the primary colors black, yellow, magenta, and cyan, respectively, are disposed. The process units 1K, 1Y, 1M, and 1C serve as image forming units that form images using developing agents of black, yellow, magenta, and cyan. It is to be noted that the suffixes K, Y, M, and C denote colors black, yellow, magenta, and cyan, respectively, and these suffixes are omitted, unless discrimination of the colors is necessary.

The process units 1K, 1Y, 1M, and 1C includes toner bottles 6K, 6Y, 6M, and 6C that store unused toner of black, yellow, magenta, and cyan, respectively. The process units 1K, 1Y, 1M, and 1C all have the same configuration as all the others, differing only in the color of toner employed. Thus, a description is provided of the process unit 1K as an example of the process units. As illustrated in FIG. 14, the process unit 1K for forming a black toner image includes a drum-shaped image bearing member (i.e., photosensitive drum) 2K serving as a latent image bearing member, a charging device 4K, a developing device 5K, a drum cleaning device 3K, a charge neutralizer, and so forth. The process unit 1K is detachably attachable relative to the main body housing of the image forming apparatus, thereby allowing consumables in the process unit 1K to be replaced at once.

An exposure device 7 is disposed above the process units 1K, 1Y, 1M, and 1C. The exposure device 7 includes a light source such as a laser diode to project laser light based on image data.

A transfer unit 15 serving as a primary transfer unit is disposed below the process units 1K, 1Y, 1M, and 1C. The transfer unit 15 includes four primary transfer rollers 19K, 19Y, 19M, and 19C, the intermediate transfer belt 16, the drive roller 18, a driven roller 17, the secondary transfer roller 120, a belt cleaning device 121, a cleaning auxiliary roller 122, and so forth. The primary transfer rollers 19K, 19Y, 19M, and 19C face the image bearing members 2K, 2Y, 2M, and 2C, respectively, via the intermediate transfer belt 16. The intermediate transfer belt 16 is formed into an endless loop and entrained around the drive roller 18 and the driven roller 17. The intermediate transfer belt 16 is moved in a predetermined direction. The secondary transfer roller 120 is disposed facing the drive roller 18 and serves as a secondary transfer device. The image bearing members 2K, 2Y, 2M, and 2C serve as first image bearing members. The intermediate transfer belt 16 serves as a second image bearing member on which a composite image is transferred.

The sheet tray 130 and the sheet feed roller 130a are disposed substantially at the bottom of the image forming apparatus. The sheet tray 130 stores a plurality of recording media P. The sheet feed roller 130a picks up and sends a recording medium P from the sheet tray 130 to a sheet path 131. A pair of timing rollers 132 is disposed near the end of the sheet path 131. The pair of timing rollers 132 stops temporarily the recording medium.

The pair of the timing rollers 132 is disposed near the intermediate transfer belt 16 at the upstream side in the conveyance direction of the recording medium P. The pair of the timing rollers 132 stops temporarily the recording medium P so as to align with a toner image on the intermediate transfer belt 16. Immediately before transferring the toner image formed on the intermediate transfer belt 16 to the recording medium P in a secondary transfer nip defined by the drive roller 18 and the secondary transfer roller 120 via the intermediate transfer belt 16, the pair of the timing rollers 132 rotates again to feed the recording medium P to the secondary nip at a predetermined timing.

Sheet conveyor rollers herein refer to rollers associated with conveyance of the recording medium P. The sheet conveyor rollers include, but are not limited to the sheet feed roller 130a, a timing drive roller, a pair of sheet output rollers 137, and a pair of sheet reverse conveyor rollers 143.

Substantially above the secondary transfer nip between the secondary transfer roller 120 and the drive roller 18, a post-transfer sheet path 133 is provided. Substantially near the end of the post-transfer sheet path 133, the fixing device 134 serving as a fixing section is disposed. The fixing device 134 includes a fixing roller 134a and a pressing roller 134b. The fixing roller 134a includes a heat source such as a halogen lamp inside thereof. While rotating, the pressing roller 134b pressingly contacts the fixing roller 134a at a predetermined pressure, thereby forming a heated area called a fixing nip therebetween.

A post-fixing sheet path 135 is provided above the fixing device 134. At the end of the post-fixing sheet path 135, the post-fixing sheet path 135 splits into a sheet output path 136 and a reverse conveyor path 141. A switching member 142 that swingably rotates about a shaft 142a is disposed at the post-fixing sheet path side. The pair of sheet output rollers 137 is disposed at the end of the sheet output path 136. The end of the reverse conveyor path 141 joins the sheet feed path 131. The pair of reverse conveyor rollers 143 is disposed on the reverse conveyor path 141. The sheet output tray 144 is disposed at the upper portion of the image forming apparatus. The sheet output tray 144 is formed by curving a top cover of the image forming apparatus inward.

A powder storage (toner storage) 10 for storing waste toner is disposed between the transfer device 15 and the sheet tray 130. The powder container 10 is detachably attachable relative to the main body housing of the image forming apparatus.

In the image forming apparatus of the present illustrative embodiment, the sheet feed roller 130a and the secondary transfer roller 120 need to be spaced apart due to conveyance of the recording medium P. Such an empty space is used to accommodate the powder container 10, thereby making the image forming apparatus as a whole as compact as is usually desired.

Still referring to FIG. 14, a description is provided of a basic image forming operation performed by the image forming apparatus of the present illustrative embodiment. In FIG. 14, as the sheet feed roller 130a is rotated based on a sheet feeding signal from a controller of the image forming apparatus, the top sheet of the recording media stacked on the sheet tray 130 is separated and fed to the sheet path 131. As the leading end of the recording medium P reaches a nip portion defined by the pair of the timing rollers 132, rotation of the pair of the timing rollers 132 is stopped temporarily so as to align the recording medium P with the toner image formed on the intermediate transfer belt 16 and to correct skew of the leading end of the recording medium P.

A description is provided of the image forming operation of the process unit 1K as an example of the image forming operation of the process units. Initially, the surface of the image bearing member 2K is uniformly charged at a high electrical potential by the charging device 4K. The exposure device 7 illuminates the image bearing member 2K with a laser beam L based on image data. As a result, the electrical potential of the illuminated portion of the image bearing member 2K drops, thereby forming an electrostatic latent image on the surface of the image bearing member 2K. Fresh (unused) black toner is supplied to the developing device 5K from the toner bottle 6K.

Subsequently, the electrostatic latent image formed on the image bearing member 2K is supplied with the black toner by the developing device 5K, and the black toner image is formed on the image bearing member 2K. Then, the black toner image on the image bearing member 2K is transferred onto the intermediate transfer belt 16 in an intermediate transfer process.

The drum cleaning device 3K removes residual toner remaining on the surface of the photosensitive drum 2K after the intermediate transfer process. The removed residual toner is transported to a waste toner container in the process unit 1K by a waste toner conveyor. The charge neutralizer removes residual charge remaining on the image bearing member 2K after cleaning.

Similar to the image forming operation in the process unit 1K, in the process unit 1Y, 1M, and 1C, toner images are formed on the image bearing members 2Y, 2M, and 2C, and each of the toner images is transferred onto the intermediate transfer belt 16 such that they are superimposed on top of the black toner image which has been transferred on the intermediate transfer belt 16, thereby forming a composite toner image on the intermediate transfer belt 16.

As the toner images are transferred onto the intermediate transfer belt 16 one atop the other, rotation of the pair of timing rollers 132 and the sheet feed roller 130a is initialized to send the recording medium P to the secondary transfer roller 120 in appropriate timing such that the recording medium P is aligned with the composite toner image formed on the intermediate transfer belt 16. Subsequently, at the secondary transfer nip between the secondary transfer roller 120 and the intermediate transfer belt 16, the toner image formed on the intermediate transfer belt 16 is transferred onto the recording medium P in a process known as a secondary transfer process, thereby forming an image on the recording medium P.

After the composite toner image is transferred onto the recording medium P, the recording medium P is transported, via the post-transfer sheet path 133, to the fixing device 134 in which heat and pressure are applied to the recording medium P, thereby fixing the composite toner image on the recording medium P. More specifically, the recording medium P bearing an unfixed toner image on the surface thereof is delivered to the fixing device 134 and interposed between a fixing roller 134a and a pressing roller 134b in the fixing device 134. Heat and pressure are applied to the unfixed toner image on the recording medium P, thereby fusing and fixing the toner image on the recording medium P. After the composite toner image is fixed on the recording medium P, the recording medium P is delivered from the fixing device 134 to the post-fixing sheet path 135.

It is to be noted that when the recording medium P is discharged from the fixing device 134, the switching member 142 is at the position indicated by a solid line in FIG. 14. In this state, the place near the end of the post-fixing sheet path 135 is opened. After the recording medium P is discharged from the fixing device 134, the recording medium P is delivered along the post-fixing sheet path 135 to the pair of the sheet output rollers 137 and discharged onto the sheet output tray 144.

For double sided printing, after the rear end of the recording medium P conveyed by the pair of sheet output rollers 137 passes through the post-fixing sheet path 135, the switching member 142 moves to a position indicated by a broken line in FIG. 14 to close the sheet path near the end of the post-fixing sheet path 135. Substantially at the same time, the pair of sheet output rollers 137 starts to rotate in the opposite direction, thereby transporting the recording medium P in the opposite direction and allowing the recording medium P to enter the reverse conveyor path 141.

The recording medium P conveyed along the reverse conveyor path 141 passes through the pair of reverse conveyor rollers 143 and arrives at the pair of the timing rollers 132. Subsequently, the pair of the timing rollers 132 stops the recording medium P temporarily and sends the recording medium P again in appropriate timing such that the recording medium P is aligned with the toner image for the second side (back surface) formed on the intermediate transfer belt 16. As the recording medium P passes through the secondary transfer roller 120, the toner image is transferred onto the second side of the recording medium P.

After the toner image on the second side of the recording medium P is fixed thereon by the fixing device 134, the recording medium P is discharged from the fixing device 134 and delivered to the sheet output tray 144 through the post-fixing sheet path 135, the sheet output path 136, and the pair of the sheet output rollers 137, accordingly.

After the toner image on the intermediate transfer belt 16 is transferred onto the recording medium P, residual toner not having been transferred onto the recording medium P is adhered to the intermediate transfer belt 16. The residual toner is removed from the intermediate transfer belt 16 by a belt cleaning device 121.

The toner removed from the intermediate transfer belt 16 is delivered to the powder container 10 by the waste toner conveyor and collected in the powder container 10.

In a case in which paper jams occur during printing, users may manually open the lateral cover 8 which rotates about the shaft 12 and remove the jammed paper from inside. In a case in which the recording medium P is caught between the pair of timing rollers 132, it is difficult to remove the recording medium P from the timing rollers 132 while the timing rollers 132 press against each other at a high pressure.

According to the present illustrative embodiment, the transfer roller 120 and one of the timing rollers 132, that is, the drive roller, are disposed inside the lateral cover 8. With this configuration, as the lateral cover 8 is opened, the transfer roller 120 and the pair of timing rollers 132 can be separated at the same time, thereby facilitating removal of the jammed paper quickly. More specifically, moving the lateral cover 8 about the shaft 12 towards the front allows the fixing device 134, the end portion of the intermediate transfer belt 16, the driven roller, and so forth to be visible, hence facilitating removal of the jammed paper.

The gear transmission device may further include a transmission device equipped with a downstream external gear, a downstream internal gear, and a downstream pulley. The downstream external gear, the downstream internal gear, and the downstream pulley are disposed alone or in combination on a transmission path downstream from one of the first external gear and from the first internal gear.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A power transmission device, comprising:
   a first frame;
   a drive motor including a first rotary shaft, attached to a first side of the first frame, the first rotary shaft including external teeth;
   a first driven gear near the first rotary shaft, the first driven gear including an annular concave portion having internal teeth on an inner circumferential surface of the annular concave portion, the first driven gear being configured to transmit a first drive torque from the drive motor to a first driven rotary body having a second rotary shaft; and
   a second driven gear near the first rotary shaft, the second driven gear including external teeth on an outer circumferential surface of the second driven gear, the second driven gear being configured to transmit a second drive torque from the drive motor to a second driven rotary body having a third rotary shaft, wherein
   the first driven gear is configured to be mounted on the second rotary shaft of the first driven rotary body as a single integrated member in a state in which the annular concave portion faces a second side of the first frame opposite the first side, and
   the external teeth of the first rotary shaft of the drive motor is configured to be directly connected to the internal teeth of the annular concave portion.

2. The power transmission device according to claim 1, wherein the second driven gear is supported by the second rotary shaft of the first driven rotary body.

3. The power transmission device according to claim 2, further comprising:
   a third driven gear configured to receive the second drive torque from the second driven gear, the third driven gear being configured to be mounted on the third rotary shaft of the second driven rotary body as a single integrated member.

4. The power transmission device according to claim 3, further comprising:
   a second frame facing the first frame via the first driven gear,
   wherein the first frame and the second frame support the third rotary shaft of the second driven rotary body.

5. The power transmission device according to claim 1, further comprising:
   a rib on the second side of the first frame and facing the annular concave portion, the rib surrounding at least a portion of an outer circumferential surface of the first driven gear.

6. The power transmission device according to claim 1, wherein the second driven gear is between the first driven gear and the first frame.

7. The power transmission device according to claim 1, further comprising:
   a second frame facing the first frame via the first driven gear,
   wherein the first frame and the second frame are configured to support the second rotary shaft of the first driven rotary body.

8. The power transmission device according to claim 1, wherein the first driven gear includes an access hole at an end side opposite the second side of the first frame, the access hole being accessible to the first rotary shaft of the drive motor.

9. An image forming apparatus comprising:
   the power transmission device of claim 1.

* * * * *